United States Patent [19]

Geiger et al.

[11] 4,261,315

[45] Apr. 14, 1981

[54] METHOD AND APPARATUS FOR CONTROLLING THE OPERATION OF AN INTERNAL COMBUSTION ENGINE WITH SPARK IGNITION

[75] Inventors: Istvan Geiger, Brunswick; Klaus Stamm, Wolfsburg, both of Fed. Rep. of Germany

[73] Assignee: Volkswagenwerk Aktiengesellschaft, Fed. Rep. of Germany

[21] Appl. No.: 44,051

[22] Filed: May 31, 1979

[30] Foreign Application Priority Data

Jun. 3, 1978 [DE] Fed. Rep. of Germany ....... 2824472

[51] Int. Cl.³ .............................. F02B 5/02; F02P 5/04
[52] U.S. Cl. .............................. 123/486; 123/146.5 A; 123/478; 123/435
[58] Field of Search ........ 123/32 EB, 32 EC, 32 EA, 123/32 ST, 119 ED, 117 R

[56] References Cited

U.S. PATENT DOCUMENTS

| 2,220,558 | 11/1940 | Van Dijck et al. | 123/119 ED |
| 3,195,529 | 7/1965 | Walker | 123/117 R |
| 3,734,069 | 5/1973 | Akiyama et al. | 123/32 ST |
| 3,903,856 | 9/1975 | McDougal et al. | 123/117 R |
| 3,916,840 | 11/1975 | Geiger | 123/32 ST |
| 4,015,569 | 4/1977 | Lesher et al. | 123/32 ST |
| 4,104,998 | 8/1978 | Fenn | 123/117 R |
| 4,168,679 | 9/1979 | Ikeura et al. | 123/117 R |

Primary Examiner—P. S. Lall
Attorney, Agent, or Firm—Brumbaugh, Graves, Donohue & Raymond

[57] ABSTRACT

A method for operating an internal combustion engine under varying load conditions includes different controls which are used in first, second and third load ranges of the engine. In the first, lowest load range, including idle operation, a constant lean fuel-air ratio and constant mixture volume are supplied to the engine while the ignition timing is varied to provide a more advanced timing with increased engine load. In the second, intermediate load range, the lean fuel-air ratio is again maintained constant, the ignition timing corresponding to the most advanced ignition timing of the first range is maintained constant, and the mixture volume is varied from the volume corresponding to the first range to a higher volume with increased engine load. In the third, highest range of engine load, the mixture volume is maintained constant, the ignition timing is varied only as required to prevent knocking of the engine, and the fuel-air ratio is varied to supply a richer mixture with increased engine load. In one embodiment of the invention, the fuel-air ratio and ignition timing are controlled by the use of an electronic control circuit which responds to signals representative of a control lever position and the engine speed. The mixture volume is controlled by a conventional throttle flap which is linked in a special manner to the control lever.

10 Claims, 6 Drawing Figures

METHOD AND APPARATUS FOR CONTROLLING THE OPERATION OF AN INTERNAL COMBUSTION ENGINE WITH SPARK IGNITION

BACKGROUND OF THE INVENTION

This invention relates to a method and apparatus for controlling the operation of a spark ignited internal combustion engine. The method and apparatus are particularly useful for controlling the operation of a gasoline engine in a motor vehicle.

There are three generally recognized control parameters which are useful for controlling the operation of a spark ignited internal combustion engine of the type used in a motor vehicle. These control parameters include fuel-air ratio, $\lambda$, mixture volume, $Q_L$, and ignition timing, more particularly spark advance angle $\alpha_z$. All of these parameters are generally responsive to the driver's actuation of a gas pedal or other accelerator in the vehicle. The particular condition of these parameters determine the engine output torque and rotational speed. Conventional engines require adjustment, such that, for each setting of the gas pedal, there is an optimum condition for the values of air-fuel ratio, mixture volume, and ignition timing.

Such optimum tuning of all three parameters is difficult, if not impossible, to accomplish for all operating modes of the engine, including idling, partial load and full load, each at various engine speeds. It must also be recognized that the engine must be tuned to achieve high torque output and low fuel consumption, as well as reduced exhaust gas emissions in all operating ranges of the engine. Conventional methods for controlling an engine by coupling all three of these parameters do not achieve the optimum operating performance characteristics and low emission value sought, because it is impossible to separately regulate each of these parameters for optimum operation under the wide range of engine speeds and loads normally encountered by the engine.

In prior U.S. Pat. No. 3,916,840 there is disclosed an internal combustion engine, which includes an auxiliary combustion chamber and wherein there is a division of controls which are activated by the accelerator pedal in two phases. In the first, low range of engine load only regulation of the mixture volume is provided. In a second, higher range of engine load, regulation of mixture air-fuel ratio is provided. Thus there is a separation of mixture ratio and mixture volume controls, and separate variation of these parameters are provided in different load ranges of the engine. This prior art arrangement is limited to an internal combustion engine with an auxiliary combustion chamber, and also provides no specific control of the ignition timing. Control of the spark ignition timing is particularly critical in an internal combustion engine which operates with a high air ratio, that is, a very lean mixture.

U.S. Pat. No. 3,195,529 describes the division of engine control into two load ranges. In this patent it is not clear whether the two control ranges comprise two ranges of engine load, or two ranges of engine speed. In the first of these ranges, including idling or low speed, the throttle is closed and only the spark timing is varied in the direction of advance, to increase engine speed. In the second range, both mixture volume and spark are varied. There is no specific provision for controlling the fuel-air ratio.

It is an object of the present invention to provide a new and improved method and apparatus for controlling the operation of a spark ignited internal combustion engine.

It is a further object to provide such a method and apparatus wherein there is optimal control of three control parameters of the engine, including fuel-air ratio, mixture volume, and ignition timing.

It is a further object of the present invention to provide such a method and apparatus wherein optimum control is realized by the use of a single engine control lever.

SUMMARY OF THE INVENTION

In accordance with the invention there is provided a method for operating an internal combustion engine under varying load conditions. The engine has operating variables including fuel-air ratio, supplied mixture volume, and ignition timing. In accordance with the invention in a first, low load range, including idle operation, a lean fuel-air ratio is maintained constant and the mixture volume is maintained constant while the ignition timing is varied to provide a more advanced timing with increased engine load. In a second, intermediate load range, the lean fuel-air ratio is also maintained constant, the ignition timing is maintained constant, and equal to the most advanced timing of the first range, and mixture volume is varied, from the first range volume to supply a greater mixture volume with increased engine load. In a third, high load range, the mixture volume is maintained constant, the ignition timing is varied only as required to prevent knocking, and the fuel-air ratio is varied to supply a richer mixture with increased engine load.

In the third load range the ignition timing may be varied in accordance with the detonation limit of the mixture to prevent knocking. In the first range the ignition timing can be varied between a relatively retarded spark for idling and an advanced spark timing, corresponding to approximately the spark adjustment for maximum torque output. In the third range, the fuel-air ratio can be varied from a lean ratio, corresponding to the ratio in the first and second ranges, to a fuel-air ratio approximately equal to the ratio corresponding to maximum engine torque output. The fuel-air ratio can be varied by varying the supply of fuel to the engine.

In accordance with the invention there is also provided apparatus for controlling operation of a spark ignited internal combustion engine by controlling ignition timing and fuel-air ratio in accordance with a control lever position and engine speed. The apparatus includes a control lever for manipulation by an engine operator. There are means, coupled to the lever, for generating first signals representative of lever position. There are provided means for generated second signals representative of engine speeds. There are also provided first and second memories, each responsive to the first and second signals, which are supplied as address signals, the first memory for providing a third output signal for controlling the ignition timing, and the second memory, for providing a fourth signal for controlling the fuel-air ratio.

There may also be provided means for generating fifth crankshaft position signals and means responsive to the third signals and the fifth signals for providing a sixth signal for triggering the spark ignition. Where there is provided at least one fuel injection valve for supplying fuel to the engine, the fourth signal can control the open time of the injection valve. The engine may also include a throttle flap, for regulating mixture volume supplied to the engine. There may be provided a coaster and a spring connecting the flap with the lever. In this arrangement, the coaster is arranged so that the lever does not move the flap for displacement of the lever in a first range of lever position, corresponding to low engine load; so that the lever moves the flap over its full range when the lever is displaced in a second intermediate range of lever positions and so that the lever continues to move in a third higher range of lever positions against the spring, with the flap fully open against the stop.

For a better understanding of the present invention, together with other and further objects, reference is made to the following description, taken in conjunction with the accompanying drawings, and the scope will be pointed out in the appended claims.

OPERATION OF AN INTERNAL COMBUSTION ENGINE IN ACCORDANCE WITH THE INVENTION

Figure 3:
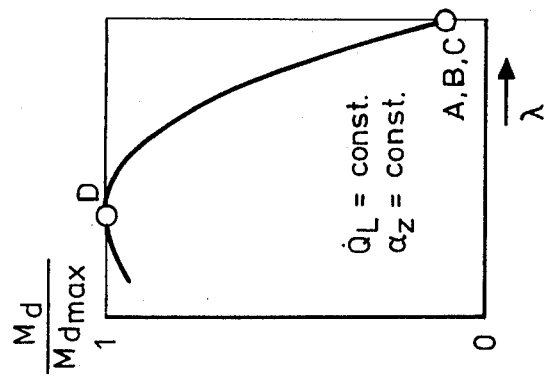
FIG. 3 is a graph showing engine output torque as a function of air-fuel ratio $\lambda$.
Figure 2:
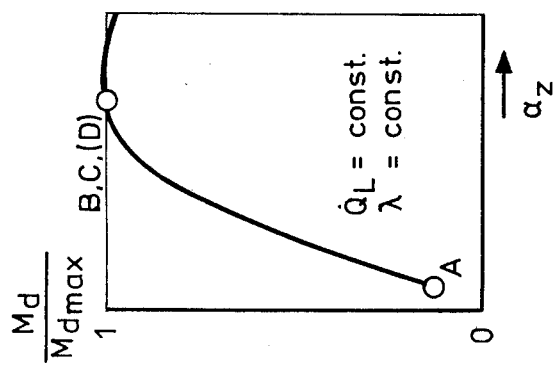
FIG. 2 is a graph showing engine output torque as a function of ignition timing advancement $\alpha_Z$.
Figure 1:
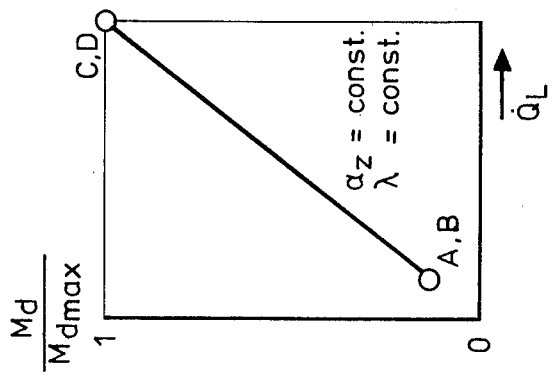
FIG. 1 is a graph showing engine output torque as a function of mixture volume $Q_L$.

FIGS. 1, 2 and 3 show variations of engine output torque with variations of the parameters of interest in accordance with the method of the invention. In particular, these parameters include fuel-air mixture volume, $Q_L$, which as shown in FIG. 1 produces an increase in engine output torque with increased fuel volume, ignition advancement $\alpha_z$, which, as shown in FIG. 2 produces an increase in engine output torque with increased ignition timing advancement, and fuel-air ratio, as specified as air ratio $\lambda$, which produces a decrease in output engine torque with increased air ratio from a starting point corresponding to the peak output torque air ratio.

Figure 4:
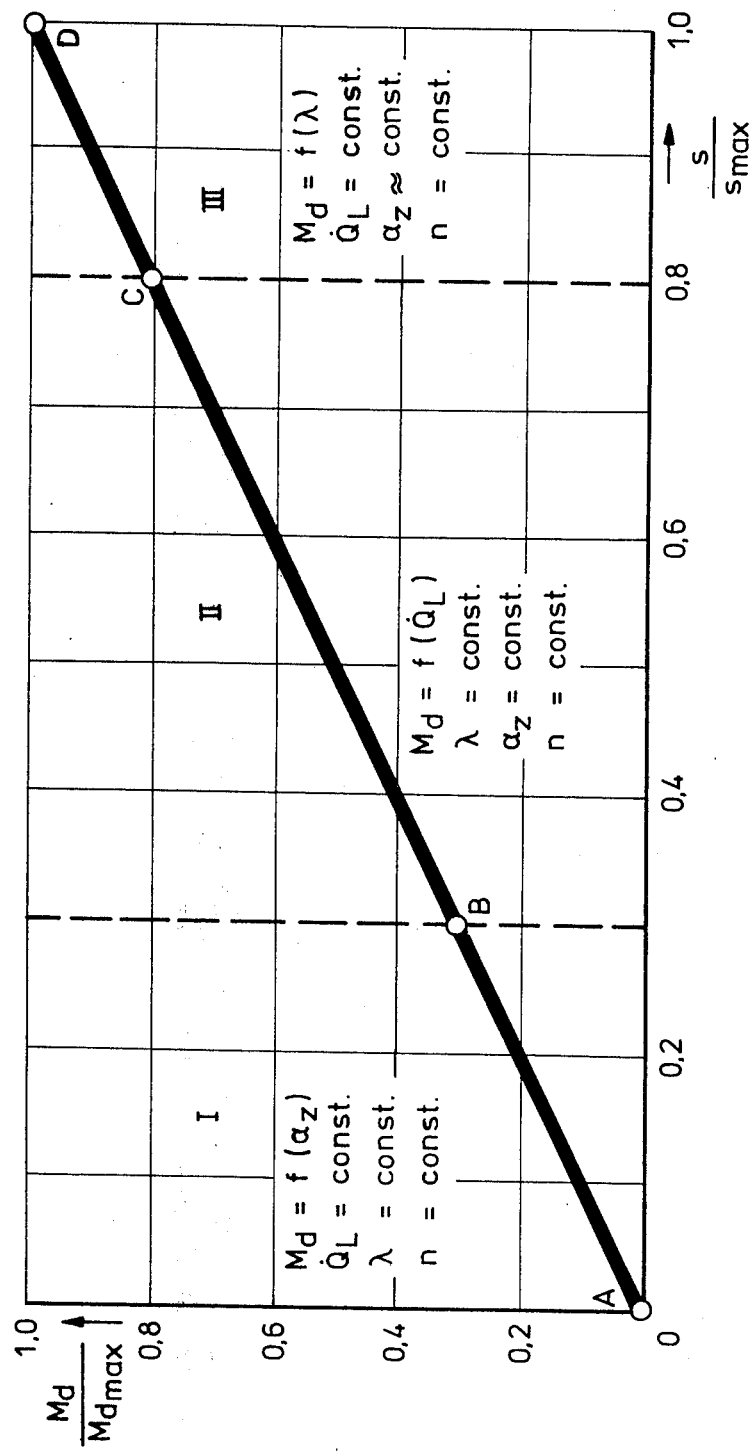
FIG. 4 is a graph showing engine output torque as a function of control lever displacement.

According to the method of the present invention, the entire scope of engine operating conditions, in particular engine load at constant engine speed, is divided in three load ranges. In each of these ranges only one of the three parameters set forth in FIGS. 1-3 is varied according to engine load. This variation of parameters in accordance with engine load is shown in FIG. 4, in which the output torque relative to the maximum torque is plotted as a ratio of gas pedal displacement. In accordance with the invention, there is provided a first, lower load range I between points A and B on the FIG. 4 graph, an intermediate range II, between points B and C in the FIG. 4 graph, and a third, high load range III, between points C and D on the graph. According to the invention, the separation initially described is achieved in that, as indicated in the several intervals of the graphs of FIG. 4, only the spark angle $\alpha_z$ is varied in the first operating range I so that output torque is a function of ignition advancement only. Both the mixture volume $Q_L$ and the fuel-air ratio $\lambda$ are maintained constant in the first operating range. The plots of FIGS. 1, 2, 3, and 4 are shown for a given selected engine speed N. The variations shown for output torque as a function of the various engine parameters are naturally applicable for any selected engine speed. In operating range I, an increase of accelerator control displacement and engine output torque from point A to point B, provides increased torque according to the curve of FIG. 2 by the use of an increased advancement of the ignition angle $\alpha_z$ from point A to point B of FIG. 2. In FIGS. 1 and 3 the points A and B are identical and correspond to a relatively low fuel-air volume and a high ratio, lean fuel mixture.

Further displacement of the control lever or accelerator to obtain a higher output torque moves the engine control parameters into the intermediate range II between points B and C on the FIG. 4 graph. In this condition, the fuel-air ratio and ignition angle are maintained constant and the output torque is increased by an increase in the mixture volume. This increase in mixture volume corresponds to movement from point B to point C in the graph of FIG. 1. In the second intermediate range of operating load, ignition time is maintained constant, so that points B and C are both at the top of the curve of FIG. 2, and the fuel-air ratio $\lambda$ is not changed, so that points B and C in FIG. 3 remain at the same high air ratio. Again, the curves of FIGS. 1-4 assume a constant engine speed, but are applicable to other selected engine speeds.

In a third and highest load operating range III, both the mixture volume and the spark angle are maintained relatively constant, with exceptions with respect to the ignition angle which will be described. The output torque is varied as a function of the fuel-air ratio $\lambda$. Referring to the curve of FIG. 3, it may be seen that a decrease in the air ratio, from the point C to the point D, moving from a leaner to a richer mixture will provide an increase in the output engine torque to the maximum torque value represented by the point D.

According to the invention, therefore, there are provided three operating load ranges for control of engine parameters, these ranges correspond approximately to idling, partial load, and full load of the engine. By different variations of the engine control parameters during these three operating ranges, it is possible to optimize engine control in each individual operating range.

Another feature of the invention is a relative independence of engine operation to tolerances in engine control, and a relative independence of operation to changes in tolerance with time. This independence arises out of the fact that each of the separate engine controls is individually varied and individually adjusted for optimum performance in a particular range of engine operations.

As referred to above with respect to the third and highest operating load range of the engine, there may be required a variation of the ignition timing $\alpha_z$ in order to prevent engine knocking in the highest operating range. In the process according to the invention this variation is limited to a modification for avoidance of knocking. This variation of ignition timing is not necessary, in principle, and may be dispensed with if a somewhat smaller fuel-air ratio is employed or the points C and D in the graph of FIG. 4 are moved somewhat to the left, corresponding to a lower mixture volume. In the example on which FIG. 4 is based, it is assumed that spark advance is retarded somewhat in the third range of engine operating load in order to accommodate the knocking limits.

In accordance with the invention the various control parameters associated with engine operation are coordinated with the several operating ranges to take into account the form of the curve shown in FIGS. 1, 2, and 3. In the lowest operating range I, there is a strong effect of adjusting ignition timing on the output torque, and this effect is utilized with the mixture volume somewhat elevated compared to the usual operating mode of an internal combustion engine. In the third and highest load range III the fuel-air mixture prevailing in the intermediate range is increased so that maximum available torque in the engine is not reached at full throttle, but rather upon the increase in richness of the fuel mixture as provided in the third operating range.

DESCRIPTION OF THE APPARATUS OF THE PRESENT INVENTION

Figure 5:
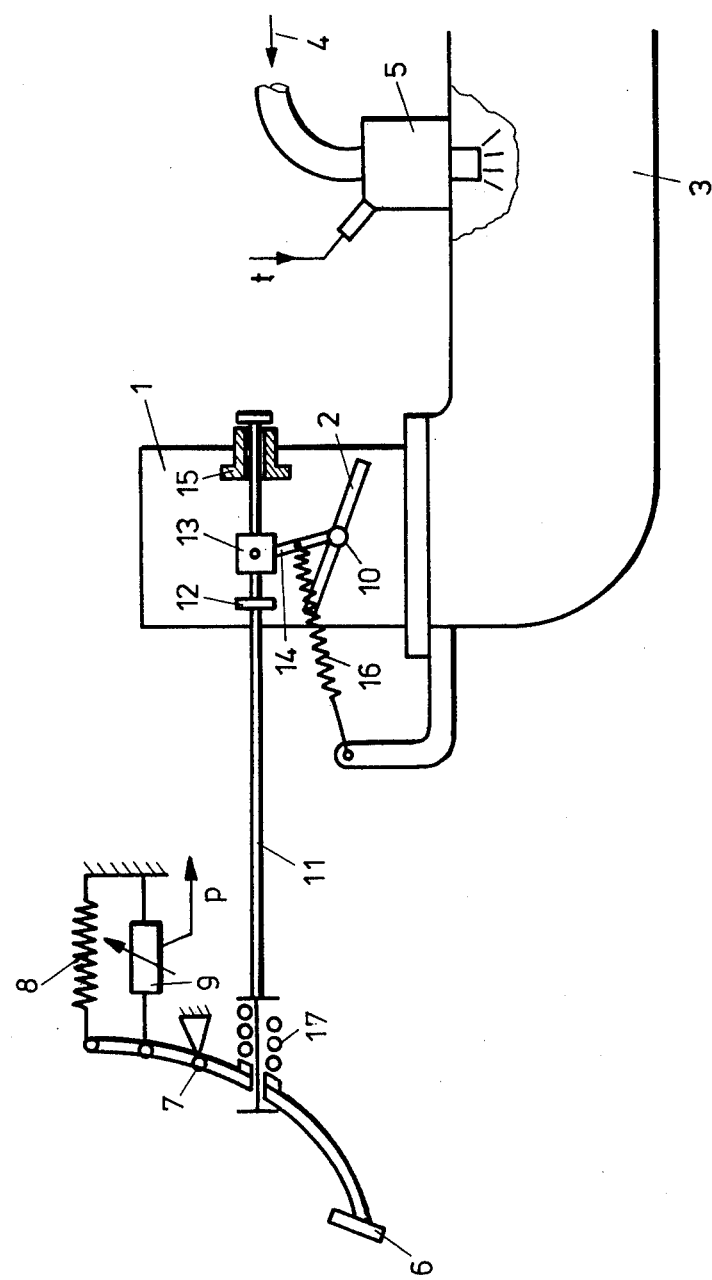
FIG. 5 is a drawing illustrating a throttle and linkage in accordance with the present invention.
Figure 6:
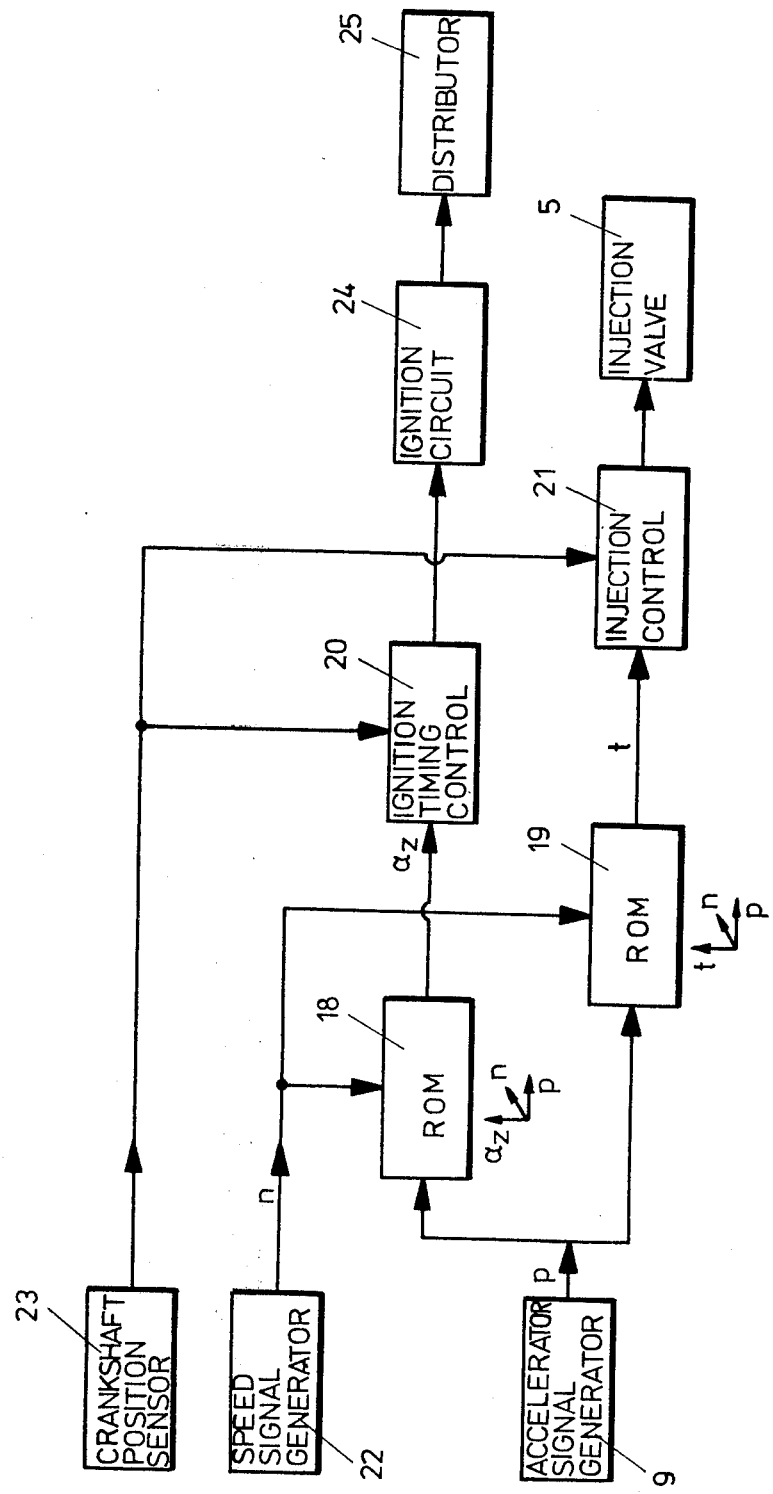
FIG. 6 is a block diagram illustrating a control circuit in accordance with the present invention.

FIG. 5 shows a schematic arrangement of an accelerator pedal and a throttle in accordance with the present invention and FIG. 6 shows a block diagram of a control system usable with the accelerator and throttle of FIG. 5.

Referring to FIG. 5, a conventional intake system is shown as 1, including a throttle 2 and an intake duct 3 which leads to at least one combustion chamber. Fuel is supplied as indicated by the arrow 4 over a fuel supply line to a fuel injection valve 5, of known type which is controlled by electrical signals t. The fuel injection valve provides injection of fuel directly into the intake duct, the combustion chambers, or into a carburetor. The apparatus of FIGS. 5 and 6 is arranged to provide separate control of these parameters of engine operations corresponding to mixture volume, ignition advancement timing, and fuel-air ratio, each of which are varied by means of the gas pedal 6, within three load ranges of operation of the engine. Gas pedal 6 comprises a control lever which is pivoted at 7 in opposition to return spring 8. A pedal position sensing apparatus 9 is provided to supply an output signal p which is respresentive of the position of the accelerator pedal 6. The first signal p is used to control operation of the ignition timing control circuit and the injection control circuit as will be further described.

The gas pedal 6 is connected to the throttle shaft 10, with flap 2 mounted thereon, by way of rod 11 and a coaster consisting of stop 12, axially fixed on rod 11 and a cooperating stop 13 which is fixed on arm 14, but movable on rod 11. In the idling position of flap 2 and pedal 6, as shown, the two stops 12 and 13 face each other across a gap corresponding to the portion of the pedal travel s representing the first and lowest operating range of engine output load in FIG. 4. As the pedal 6 moves out of the idling position shown against the action of restoring spring 8, a lever position signal p representing the setting of the gas pedal will be provided to the circuit of FIG. 6, as a first signal, but the throttle flap 2 will remain in its idling position within range I, in accordance with the method of the invention.

Upon further movement of the gas pedal and traversal of range II, the stop 12 will act on the throttle stop 13 to move the flap 2, rotating the flap clockwise into its open position at a point C in the graph of FIG. 4. When stop 13 reaches stationary stop 15, the motion of the throttle flap is halted and the throttle is maintained in its fully open condition. Throttle 2 rotates in opposition to spring 16 which is necessarily weaker than spring 17 by which rod 11 is connected to the lever of accelerator pedal 6 as will be further explained.

Spring 17 becomes operative when stops 12 and 13 are pressed against stop 15, and rod 11 can no longer move to the right in FIG. 5. In this condition motion of accelerator pedal 6 to the right can continue in opposition to spring 17 to provide further changes to the lever position signal which is output from generating circuit 9. This operation is analogous to a "kickdown" actuation of gas pedal 6 even when stop 13 is supported by stop 15. Further movement of the gas pedal 6 is required so that potentiometer 9 will transmit lever position signals p during operating phase III to the system shown in FIG. 6 which is described below.

Lever position sensor 9 can consist of a linear resistance potentiometer, digital encoder or other device for providing an electrical output signal in response to the location of accelerator lever 6. The lever position signal, or first signal p can undergo required processing, such as an analog-to-digital conversion, and is then provided to the inputs of memory devices 18 and 19, which are shown in block diagram in FIG. 6. Memories 18 and 19 are also provided with second signals which are output from a speed signal generator 22 responsive to the speed of operation of the engine and which outputs a second signal n, representative of engine speed. Signals p and n are used as address signals in read-only-memories 18 and 19 to derive from these read-only-memories third and fourth signals $\alpha_z$ and t which are representative of the required ignition timing advancement and fuel volume for optimum engine operation in accordance with the position of the accelerator lever 6 and the speed of the engine. In the circuit of FIG. 6, memories 18 and 19 are shown as conventional digital read-only-memories, which contain information on the required ignition timing and fuel injection volume necessary for optimum operation according to the accelerator pedal position and engine speed which is sensed by devices 9 and 22 and represented by the first signal p and the second signal n. Thus, these elements act as electronic cams, since each stores a relationship between three variables. The storage of quantities $\alpha_z$ and t must be such that the ignition timing $\alpha_z$ remains unchanged in ranges II and III, except for the changes required to prevent knocking, while the injection valve actuation time t remains constant in ranges I and II and thereby provides a constant fuel-air ratio by having a constant injection time duration in these ranges of engine operation, for each cylinder intake charge.

Those skilled in the art will recognize that other arrangements, for example servo-mechanisms, may accomplish the objects of the invention and generate the third and fourth signals $\alpha_z$ and t which are required for the present invention. The injection timing signals $\alpha_z$ are provided to an ignition timing circuit 20, which is also provided with fifth crankshaft position signals, which are output from shaft position sensing device 23, which synchronize the ignition timing signals with the angular position of the engine crankshaft. The signals from sensor 23 are usually generated by a trigger signal pulse generated by a magnetic asymmetry, for example, on the flywheel of the engine. This insures that sixth ignition triggering signals generated in circuit 20 and injection signals from circuit 21 will be referred to a definite time or angle in engine rotation, for example 70° before top dead center. The spark angle control circuit 20 actuates an ignition circuit 24 of a conventional type which is connected to a distributor 25. Similarly the injection control 21 received injection timing signals t and actuates injection valve 5 in a manner dependent upon the number of combustion chambers in the engine.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

We claim:

1. A method for operating an internal combustion engine under varying load conditions, said engine having operating variables comprising fuel-air ratio, supplied mixture volume, and ignition timing, the method comprising:

in a first, low load range, including idle operation, maintaining constant lean fuel-air ratio and constant mixture volume, and varying ignition timing to provide a more advanced timing with increased engine load;

in a second, intermediate load range, maintaining constant lean fuel-air ratio and constant ignition timing corresponding to the most advanced timing of said first range, and varying mixture volume to increase from the first range volume, to supply a greater mixture volume with increased engine load;

and in a third, high load range, maintaining constant mixture volume, varying ignition timing only as required to prevent knocking, and varying fuel-air ratio to supply a richer mixture with increased engine load.

2. A method in accordance with claim 1 wherein, in said third load range, said ignition timing is varied in accordance with the detonation limit of said mixture, thereby to prevent knocking.

3. A method in accordance with claim 1 wherein, in said first load range said ignition timing is varied between a relatively retarded spark, for idling, and an advanced spark, corresponding to approximately the spark adjustment corresponding to maximum torque output.

4. A method in accordance with claim 1 wherein, in said third load range, said fuel-air ratio varies from a lean ratio, corresponding to said first and second ranges to a fuel-air ratio approximately equal to the ratio corresponding to maximum torque output.

5. A method in accordance with any of claims 1 to 4 wherein said fuel-air ratio varies by varying the supply of fuel to said engine.

6. Apparatus for controlling operation of an internal combustion engine, by controlling ignition timing, fuel-air mixture volume and fuel-air ratio, in a first, low load range, including idling operation, in a second, intermediate load range, and in a third, high load range in accordance with accelerator pedal position and engine speed, comprising:

accelerator pedal means, for manipulation by an engine operator, for maintaining a constant mixture volume in said first low load range, for varying mixture volume in said second, intermediate load range to increase from the first range volume, to supply a greater mixture volume with increased engine load, and for maintaining constant mixture volume in said third, high load range;

means coupled to said pedal for generating first signals representative of accelerator pedal position;

means for generating second signals representative of engine speed;

means including a first memory responsive to said first and second signals, supplied as addressed signals, for providing a third output signal for controlling said ignition timing for varying ignition timing to provide a more advanced timing with increased engine load in said first, low load range, and for maintaining constant ignition timing, corresponding to the most advanced timing of said first range, in said second and third ranges; and means including a second memory, responsive to said first and second signals, supplied as address signals, for providing a fourth signal for controlling said fuel-air ratio for maintaining constant lean fuel-air ratio in said first range and said second range, and for varying fuel-air ratio to supply a richer mixture with increased engine load in said third range.

7. Apparatus as specified in claim 6, further including means for generating fifth crankshaft position signals, and means responsive to said third signals and said fifth crankshaft position signals for providing a sixth signal for triggering said spark ignition.

8. Apparatus as specified in claim 6 wherein there is provided at least one fuel injection valve for supplying fuel to said engine and wherein said fourth signal controls the open time of said valve.

9. Apparatus as specified in any of claims 6 to 8 wherein said engine includes a throttle flap for regulating mixture volume supplied to said engine, wherein there is provided a coaster and a spring connecting said flap and said lever, said coaster being arranged so that said lever does not move said flap for displacement of said lever in a first range of lever positions, corresponding to low engine load, so that said lever moves said flap over its full range when said lever is displaced in a second, intermediate range of lever positions, and so that said lever continues to move in a third higher range of lever positions against said spring, with said flap fully open against a stop.

10. Apparatus as specified in claim 6, including means for retarding ignition timing in said third, high load range, as required to prevent knocking.

* * * * *